(12) United States Patent
Krause Perin et al.

(10) Patent No.: US 11,327,158 B1
(45) Date of Patent: May 10, 2022

(54) TECHNIQUES TO COMPENSATE FOR MIRROR DOPPLER SPREADING IN COHERENT LIDAR SYSTEMS USING MATCHED FILTERING

(71) Applicant: AEVA, INC., Mountain View, CA (US)

(72) Inventors: Jose Krause Perin, Mountain View, CA (US); Mina Rezk, Haymarket, VA (US); Kumar Bhargav Viswanatha, Santa Clara, CA (US); Rajendra Tushar Moorti, Mountain View, CA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 17/354,324

(22) Filed: Jun. 22, 2021

Related U.S. Application Data (60) Provisional application No. 63/093,599, filed on Oct. 19, 2020.

(51) Int. Cl.

| | | |
|---|---|---|
| *G01C 3/08* | (2006.01) | |
| *G01S 7/48* | (2006.01) | |
| *G01S 17/58* | (2006.01) | |
| *G01S 17/08* | (2006.01) | |
| *G01S 7/481* | (2006.01) | |

(52) U.S. Cl.
CPC .......... *G01S 7/4808* (2013.01); *G01S 7/4817* (2013.01); *G01S 17/08* (2013.01); *G01S 17/58* (2013.01)

(58) Field of Classification Search
CPC ...... G01S 7/4808; G01S 7/4817; G01S 17/08; G01S 17/58; G01S 17/89
See application file for complete search history.

(56) References Cited

U.S. PATENT DOCUMENTS

| | | | |
|---|---|---|---|
| 5,835,199 A | 11/1998 | Phillips et al. | |
| 8,455,827 B1 * | 6/2013 | Chiao | G01N 21/3554 |
| | | | 250/339.01 |
| 10,473,770 B1 * | 11/2019 | Zhu | G01S 17/931 |
| 2018/0224547 A1 | 8/2018 | Crouch et al. | |

(Continued)

OTHER PUBLICATIONS

Ranefjard, Simon. Matched Filters for Direct-Detection LiDAR in Non-Perpendicular Measurement Scenes. Degree Project, Engineering Physics and Electrical Engineering, master's level, Lulea University of Technology. https://www.diva-portal.org/smash/get/diva2:1379526/FULLTEXT01.pdf (Year: 2019).*

(Continued)

*Primary Examiner* — Mark Hellner
(74) *Attorney, Agent, or Firm* — Womble Bond Dickinson (US) LLP (57) ABSTRACT

A received signal is sampled at the LiDAR system and the received signal is converted to a frequency domain, where the received signal comprises a first frequency waveform. A matched filter is selected, where the matched filter comprises a second frequency waveform with a set of coefficients to match the first frequency waveform. The set of coefficients are updated according to a set of metrics. The received signal is filtered by the matched filter to generate a filtered received signal. Range and velocity information is extracted from the filtered received signal.

24 Claims, 8 Drawing Sheets

(56) References Cited

U.S. PATENT DOCUMENTS

2020/0041651 A1* 2/2020 Kapusta .................. G01S 13/93

OTHER PUBLICATIONS

Neilsen, Kevin D. Signal Processing on Digitized Ladar Waveforms for Enhanced Resolution on Surface Edges. Utah State University, Master of Science in Electrical Engineering Thesis. https://digitalcommons.usu.edu/cgi/viewcontent.cgi?article=1879&context=etd (Year: 2011).*

Brown, Jarrod. Real-Time Hardware Design for Improving Laser Detection and Ranging Accuracy. Florida State University, Master of Science in Electrical and Computer Engineering Thesis. file:///C:/Users/sabraham/Downloads/PDF%20datastream%20(3).pdf (Year: 2012).*

Tang, Jennifer et al. Tracking to Improve Detection Quality in Lidar for Autonomous Driving. ICASSP 2020—2020 IEEE International Conference on Acoustics, Speech and Signal Processing (ICASSP). Date of Conference May 4-8, 2020. https://ieeexplore.ieee.org/document/9053041 (Year: 2020).*

International Search Report and Written Opinion on the Patentability of Application No. PCT/US2021/055232 dated Jan. 31, 2022, 14 pages.

Knopp Robert: "Degradation of Laser Radar Doppler Signals by Fast Scanning Mirrors" Proceedinds of SPIE, Dec. 12, 1989, 6 pages.

* cited by examiner

TECHNIQUES TO COMPENSATE FOR MIRROR DOPPLER SPREADING IN COHERENT LIDAR SYSTEMS USING MATCHED FILTERING

RELATED APPLICATIONS

This application claims priority from and the benefit of U.S. Provisional Patent Application No. 63/093,599 filed on Oct. 19, 2020, the entire contents of which are incorporated herein by reference in their entirety.

TECHNICAL FIELD

The present disclosure relates generally to light detection and ranging (LiDAR) systems, for example, techniques to compensate for mirror Doppler spreading in coherent LiDAR systems.

BACKGROUND

Frequency-Modulated Continuous-Wave (FMCW) LiDAR systems include several possible phase impairments such as laser phase noise, circuitry phase noise, flicker noise that the driving electronics inject on a laser, drift over temperature/weather, and chirp rate offsets. A scanning FMCW LiDAR system may use a moving scanning mirror to steer light beams and scan a target or a target environment. To achieve a wide field of view and high frame rates, the scanning mirror may have a high angular speed. The high mirror angular speed may cause several impairments. For example, the mirror-induced Doppler shift may broaden the received signal bandwidth. The received signal intensity may be lowered, and consequently the detection probability may be reduced. Thus, the error in range, velocity, and reflectivity measurements may be increased.

SUMMARY

The present disclosure describes various examples, without limitation, methods of processing received signal in LiDAR systems.

In some examples, disclosed herein is a method of processing a received signal by a matched filter, for example, to compensate for mirror Doppler spreading. The received signal may be filtered by the matched filter based on an expected received signal shape or waveform. For example, the received signal in the frequency domain (or "input spectrum") may be filtered by the matched filter that aims to match the expected received signal power spectrum density (PSD). The filter coefficients may be constant (e.g., derived from theoretical simulation or modeling), or updated depending on key factors such as a mirror angular speed, a mirror position, a scanner geometry, a target, a scene, etc. As the detection occurs at the point where SNR is maximized, the method may result in more accurate frequency and energy measurements.

In some examples, a method in a LiDAR system is disclosed herein. A received signal is sampled at the LiDAR system and the received signal is converted to a frequency domain, where the received signal comprises a first frequency waveform. A matched filter is selected, where the matched filter comprises a second frequency waveform with a set of coefficients to match the first frequency waveform. The set of coefficients are updated according to a set of metrics. The received signal is filtered by the matched filter to generate a filtered received signal. Range and velocity information is extracted from the filtered received signal.

In some examples, a LiDAR system is disclosed herein. The LiDAR system comprises a memory and a processing device or processor operatively coupled with the memory. The processing device or processor is to sample a received signal at the LiDAR system and convert the received signal to a frequency domain, where the received signal comprises a first frequency waveform. The processing device or processor is further to select a matched filter, where the matched filter includes a second frequency waveform with a set of coefficients to match the first frequency waveform. The processing device or processor is further to update the set of coefficients according to a set of metrics, and to filter the received signal by the matched filter to generate a filtered received signal. The processing device or processor is further to extract range and velocity information from the filtered received signal.

In some examples, a non-transitory machine-readable medium is disclosed herein. The non-transitory machine-readable medium has instructions stored therein, which when executed by a processing device or processor of a LiDAR system, cause the processing device or processor to sample a received signal at the LiDAR system and convert the received signal to a frequency domain, where the received signal comprises a first frequency waveform. The processing device or processor is further to select a matched filter, where the matched filter includes a second frequency waveform with a set of coefficients to match the first frequency waveform. The processing device or processor is further to update the set of coefficients according to a set of metrics, and to filter the received signal by the matched filter to generate a filtered received signal. The processing device or processor is further to extract range and velocity information from the filtered received signal.

These and other aspects of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and examples, should be viewed as combinable unless the context of the disclosure clearly dictates otherwise.

It will therefore be appreciated that this Summary is provided merely for purposes of summarizing some examples so as to provide a basic understanding of some aspects of the disclosure without limiting or narrowing the scope or spirit of the disclosure in any way. Other examples, aspects, and advantages will become apparent from the following detailed description taken in conjunction with the accompanying figures which illustrate the principles of the described examples.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

The described LiDAR systems herein may be implemented in any sensing market, such as, but not limited to, transportation, manufacturing, metrology, medical, virtual reality, augmented reality, and security systems. According to some embodiments, the described LiDAR system may be implemented as part of a front-end of frequency modulated continuous-wave (FMCW) device that assists with spatial awareness for automated driver assist systems, or self-driving vehicles.

Figure 1A:
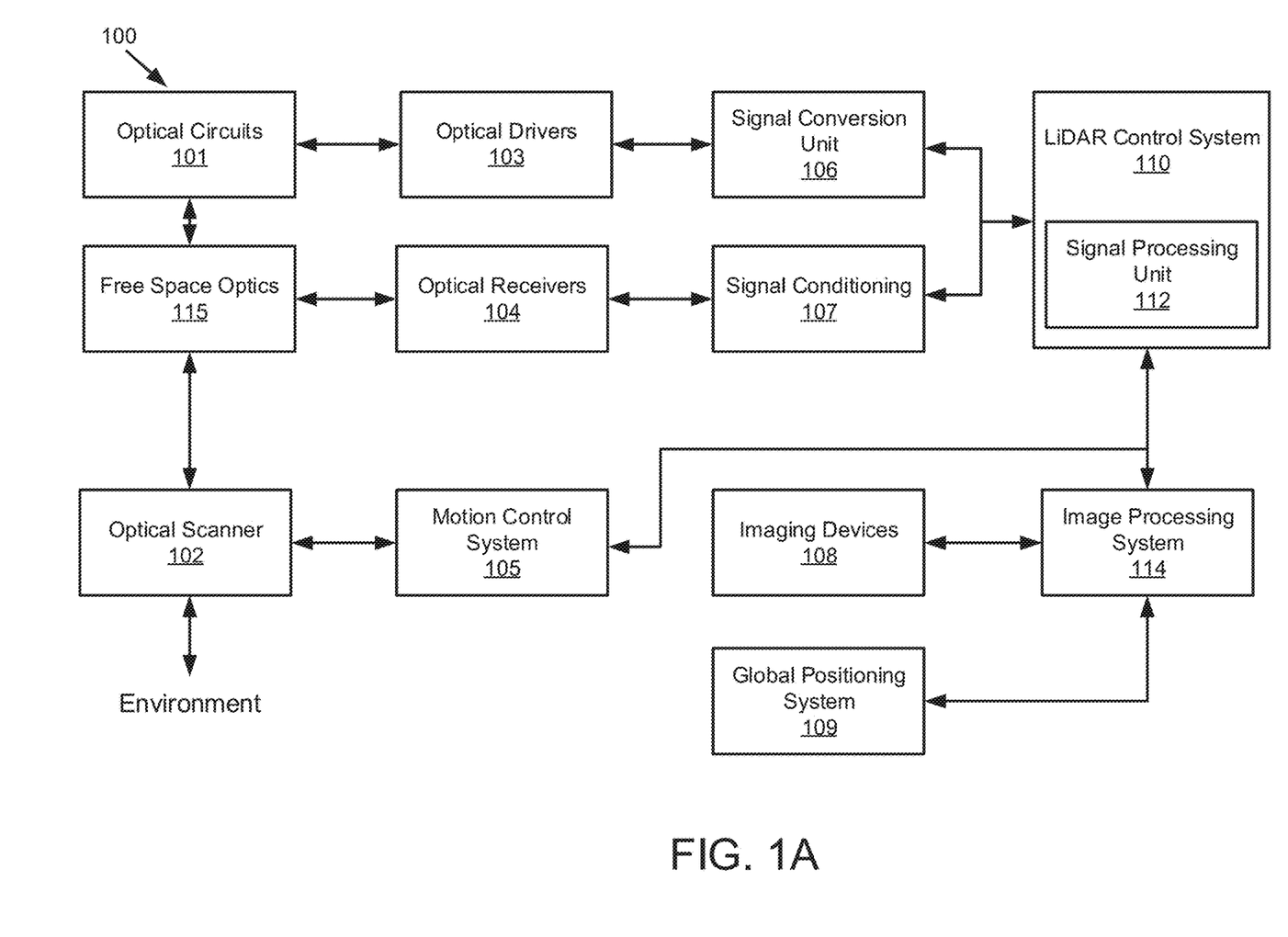
FIG. 1A is a block diagram illustrating an example LiDAR system according to embodiments of the present disclosure.

FIG. 1A illustrates a LiDAR system 100 according to example implementations of the present disclosure. The LiDAR system 100 includes one or more of each of a number of components, but may include fewer or additional components than shown in FIG. 1. According to some embodiments, one or more of the components described herein with respect to LiDAR system 100 can be implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles.

In some examples, the LiDAR system 100 includes an optical scanner 102 that includes one or more scanning mirrors that are rotatable along an axis (e.g., a slow-moving-axis) that is orthogonal or substantially orthogonal to the fast-moving-axis of the diffractive element to steer optical signals to scan a target environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coating window or the like.

To control and support the optical circuits 101 and optical scanner 102, the LiDAR system 100 includes LiDAR control systems 110. The LiDAR control systems 110 may include a processing device for the LiDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LiDAR control systems 110 may include a signal processing unit 112 such as a digital signal processor (DSP). The LiDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LiDAR control systems 110 are also configured to output digital control signals for the optical scanner 102. A motion control system 105 may control the galvanometers of the optical scanner 102 based on control signals received from the LiDAR control systems 110. For example, a digital-to-analog converter may convert coordinate routing information from the LiDAR control systems 110 to signals interpretable by the galvanometers in the optical scanner 102. In some examples, a motion control system 105 may also return information to the LiDAR control systems 110 about the position or operation of components of the optical scanner 102. For example, an analog-to-digital converter may in turn convert information about the galvanometers' position to a signal interpretable by the LIDAR control systems 110.

The LiDAR control systems 110 are further configured to analyze incoming digital signals. In this regard, the LiDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LiDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LiDAR control systems 110. In some examples, the signals from the optical receivers 104 may be subject to signal conditioning by signal conditioning unit 107 prior to receipt by the LiDAR control systems 110. For example, the signals from the optical receivers 104 may be provided to an operational amplifier for amplification of the received signals and the amplified signals may be provided to the LIDAR control systems 110.

In some applications, the LiDAR system 100 may additionally include one or more imaging devices 108 configured to capture images of the environment, a global positioning system 109 configured to provide a geographic location of the system, or other sensor inputs. The LiDAR system 100 may also include an image processing system 114. The image processing system 114 can be configured to receive the images and geographic location, and send the images and location or information related thereto to the LiDAR control systems 110 or other systems connected to the LIDAR system 100.

In operation according to some examples, the LiDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LiDAR control systems 110. The LiDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LiDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 1B:
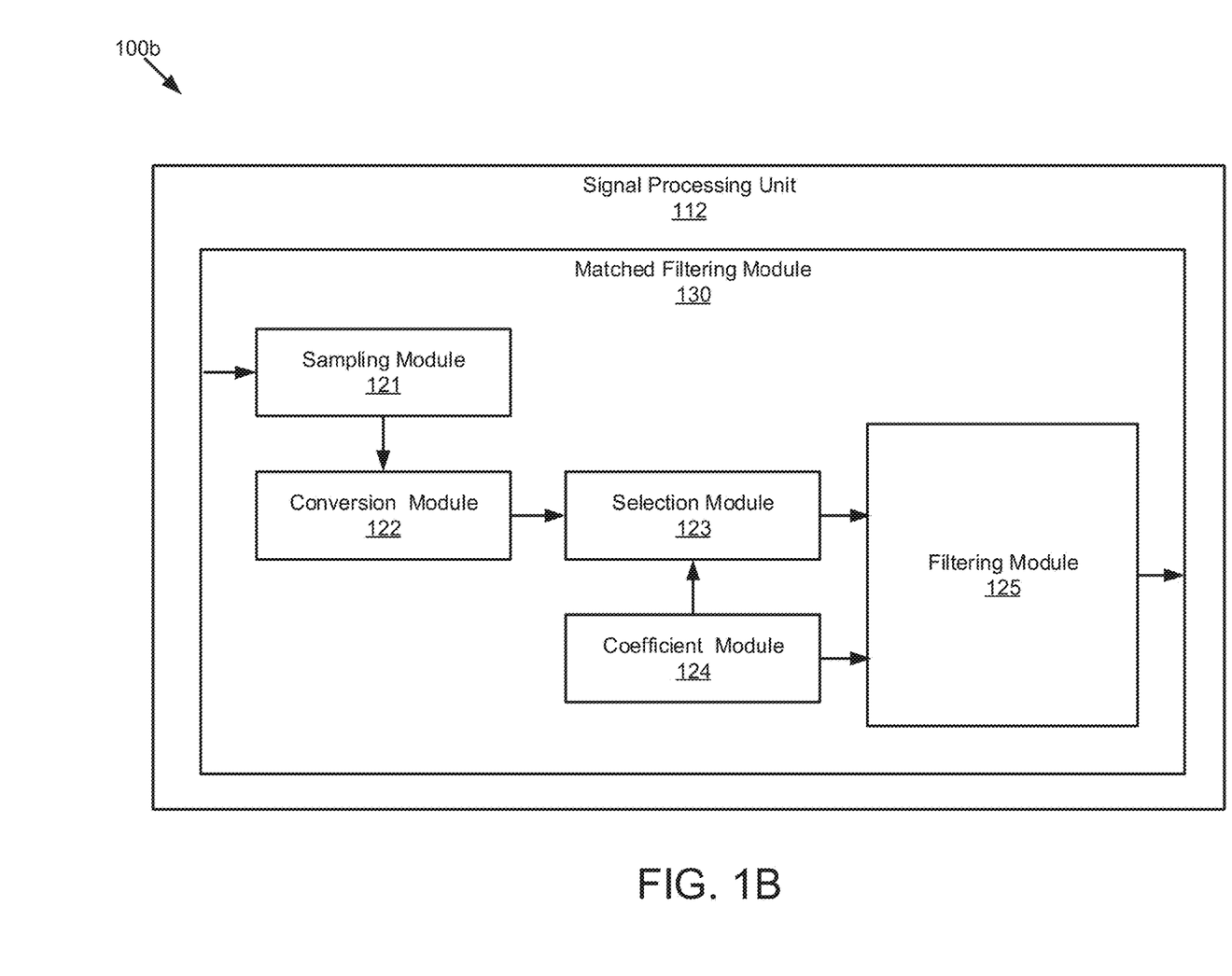
FIG. 1B is a block diagram illustrating an example of a matched filtering module of a LiDAR system according to embodiments of the present disclosure.

FIG. 1B is a block diagram illustrating an example of a matched filtering module 130 of a LiDAR system according to embodiments of the present disclosure. Referring to FIG. 1A and FIG. 1B, the signal processing unit 112 may include the matched filtering module 130. It should be noted that, although the matched filtering module is depicted as residing within the signal processing unit 112, embodiments of the present disclosure are not limited as such. For instance, in one embodiment, the matched filtering module 130 can reside in computer memory (e.g., RAM, ROM, flash memory, and the like) within system 100 (e.g., LiDAR control system 110). The scanning FMCW LiDAR system 100 may use a moving scanning mirror (e.g., included in optical scanner 102) to steer light beams and scan a target or a target environment. Objects in the target environment may scatter an incident light into a return optical beam or a target return signal. The optical scanner 102 also collects the return optical beam or the target return signal. The target return signal may be mixed with a second signal from a local oscillator, and a range dependent beat frequency may be generated. The temporal phase difference between the two waveforms may generate the beat frequency measured on the optical receivers 104 (photodetectors). In one embodiment, the beat frequency may be digitized by an analog-to-digital converter (ADC), for example, in a signal conditioning unit such as signal conditioning unit 107 in LiDAR system 100. In one embodiment, the digitized beat frequency signal may be received by the signal processing unit 112 LiDAR system 100, and then be digitally processed in the signal processing unit 112. The signal processing unit 112 including the matched filtering module 130 may process the received signal to extract range and velocity information of the target.

The matched filtering module 130 may include, but not being limited to, a sampling module 121, a conversion module 122, a selection module 123, a coefficient module 124, and a filtering module 125. In some embodiments, the matched filtering module 130 may receive a signal from the optical receivers 104 or the signal conditioning unit 107. The sampling module 121 may be configured to sample the received signal at the LiDAR system. The conversion module 122 may be configured to convert the received signal to a frequency domain, where the received signal includes a first frequency waveform. The selection unit 123 may be configured to select a matched filter, where the matched filter may include a second frequency waveform with a set of coefficients to match the first frequency waveform. The second frequency waveform may include an expected first frequency waveform of the received signal. For example, the received signal may be the beat frequency generated from the mixing of the target return signal and the local oscillator signal, thus, the second frequency waveform may be determined based on a simulation (a model) or a measurement result of the received signal. The coefficient unit 124 may be configured to update the set of coefficients according to a set of metrics. The filtering unit 125 may be configured to filter the received signal by the matched filter to generate a filtered received signal. The signal processing unit may be configured to extract range and velocity information of the target from the filtered received signal. The matched filtering module 130 may include other modules. Some or all of modules 121-125 may be implemented in software, hardware, or a combination thereof. For example, these modules may be loaded into a memory, and executed by one or more processors. Some of modules 121-125 may be integrated together as an integrated module.

Figure 2:
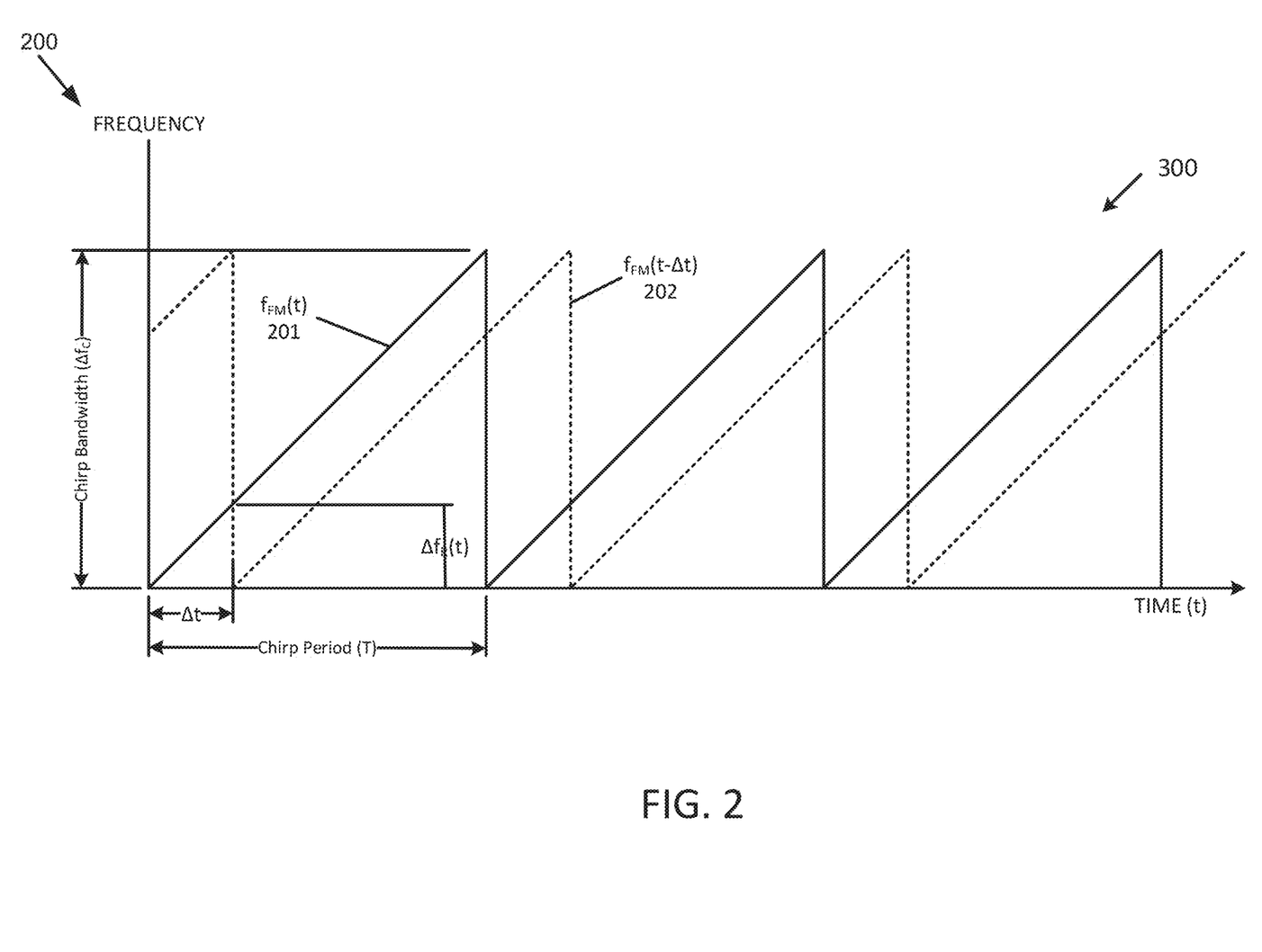
FIG. 2 is a time-frequency diagram illustrating an example of FMCW LIDAR waveforms according to embodiments of the present disclosure.

FIG. 2 is a time-frequency diagram 200 of an FMCW scanning signal 101b that can be used by a LiDAR system, such as system 100, to scan a target environment according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3A:
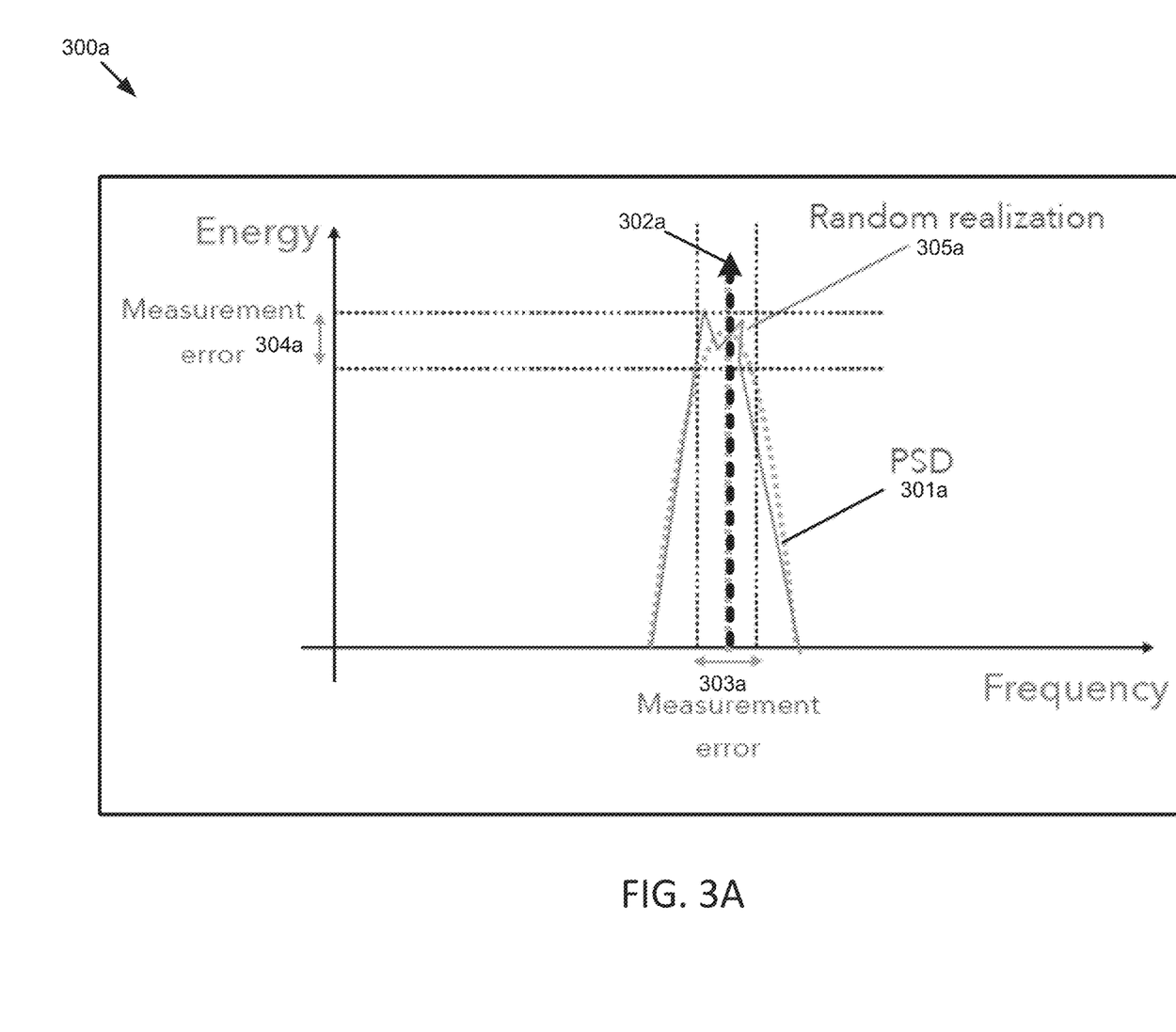
FIG. 3A is a diagram illustrating an example of a received signal power spectrum density (PSD) in a LiDAR system, when the scanning mirror has a low speed, according to embodiments of the present disclosure.
Figure 3B:
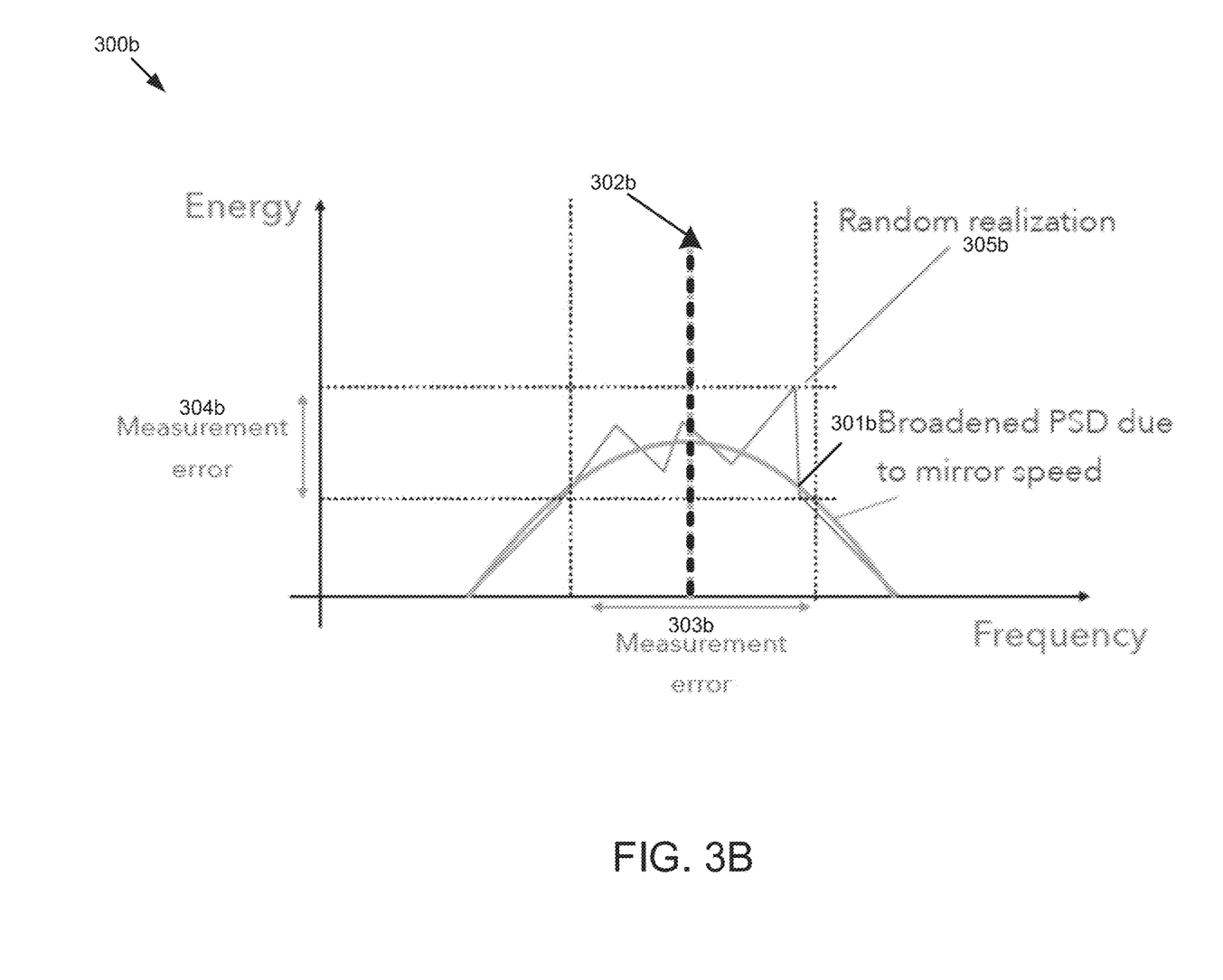
FIG. 3B is a diagram illustrating an example of received signal power spectrum density (PSD) in a LiDAR system, when the scanning mirror has a high speed, according to embodiments of the present disclosure.

FIG. 3A is a diagram 300a illustrating an example of received signal power spectrum density (PSD) 301a in a LiDAR system, when the scanning mirror has a low speed. FIG. 3B is a diagram illustrating an example of received signal power spectrum density (PSD) in a LiDAR system, when the scanning mirror has a high speed. A scanning LiDAR system (e.g., FMCW LiDAR) may use a moving scanning mirror to steer light beams and scan a target or a target environment. To achieve a wide field of view and high frame rates, the scanning mirror may have a high angular speed. In some scenarios, the high mirror angular speed may cause several impairments. For example, the mirror-induced Doppler shift may broaden the received signal bandwidth. As such, in these scenarios, the received signal intensity may be lowered, and consequently the detection probability may be reduced and cause an increase in errors related to range, velocity, and reflectivity measurements.

Referring to FIG. 3A and FIG. 3B, the moving scanning mirror (e.g., scanning mirror included as part of system 100 in FIG. 1) may induce Doppler Shift on the outgoing light beam and the incoming light beam, which may be the target return signal. As depicted in FIG. 3A, when the scanning mirror is moving at a low mirror speeds (e.g., <5 kdeg/s), the mirror-induced Doppler has little impact on the signal quality. The peak value 302a may be detected in the PSD 301a of the received signal. The received signal may have random realization 305a, which may be minor. The received signal may have a reasonable range of frequency measurement error 303a and a reasonable range of power measurement error 304a.

As depicted in FIG. 3B, when the scanning mirror is moving at a high mirror speeds (>5 kdeg/s), there may be a significant broadening of the signal power spectrum density (PSD) 301b. As a result, the measured signal energy may be lower on average. Thus, the probability of detection may be consequently reduced. The measurement error on frequency 303b and/or the measurement error on energy 304b may be higher due to the randomness (e.g., random realization 305b) of the signal.

Figure 4:
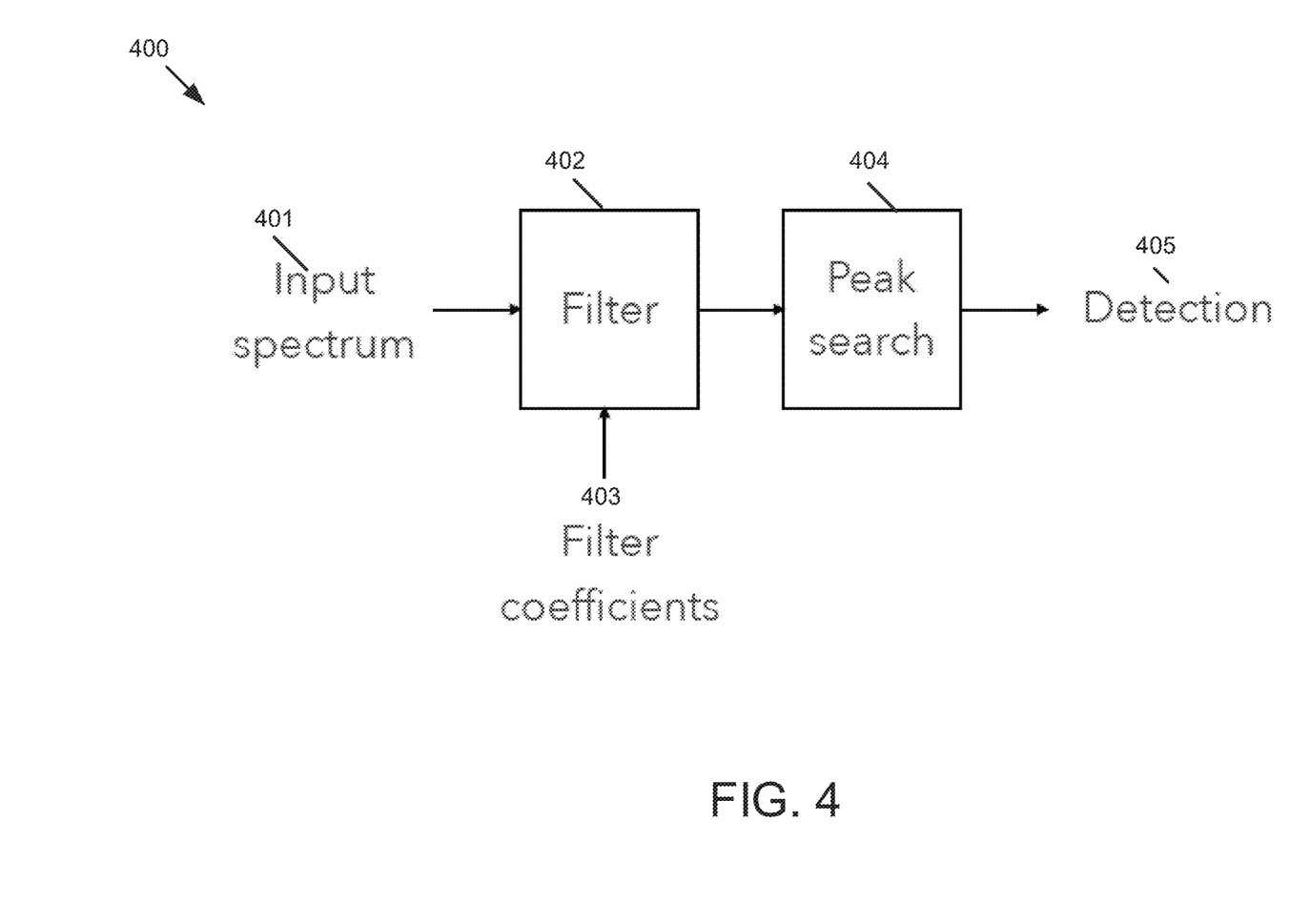
FIG. 4 is a diagram illustrating an example of a matched filter of a LiDAR system according to embodiments of the present disclosure.

FIG. 4 is a diagram 400 illustrating an example of a matched filter of a LiDAR system according to embodiments of the present disclosure. The embodiments described herein provide multiple approaches to combat mirror Doppler spreading. For example, frequency domain techniques and time domain techniques can be employed by embodiments. One approach in the frequency domain techniques is matched filtering in the frequency domain. Under this approach, the received signal is filtered by a matched filter in the frequency domain, where the matched filter includes an expected received signal shape or waveform in frequency domain. The expected received signal frequency waveform may be determined based on theoretical models or simulations or measurements from predetermined conditions (e.g., conditions determined in a lab setting or testing environment, artificial intelligence, . . . , etc.).

Referring to FIG. 4, a received signal 401 in the frequency domain, for example, an input spectrum, may be input into the matched filter 402. The received signal 401 may include a first frequency waveform, which may be an unknown waveform, e.g., at a starting point of a matched filtering process. The matched filter 402 may include a second frequency waveform, which may be the expected received signal frequency waveform. In some embodiments, the second frequency waveform may have a set of coefficients to match or approximate the first frequency waveform. In some embodiments, the second frequency waveform may be an expectation or an estimation or an approximation of the first frequency waveform, determined based on a theoretical model or experimental measurements. In some embodiments, the second frequency waveform may be determined based on a model or a simulation or a measurement of the LiDAR system, e.g., an optical-subsystem of the LiDAR system.

In one embodiment, the second frequency waveform may be based on an estimation of a power spectrum density (PSD) function of the received signal. For example, the matched filter 402 may include an expected received signal PSD. The matched filter 402 may be configured to compare the expected received signal PSD to the first frequency waveform and determine if there is a match.

In one embodiment, the filter coefficients 403 for the matched filter 402 may be constant. For example, the filter coefficients 403 may be derived from a theoretical simulation or modeling.

In one embodiment, the filter coefficients 403 may be updated according to a set of metrics. For example, the filter coefficients 403 may be updated depending on key factors such as an angular speed of a scanning mirror, a position of the scanning mirror, an optical scanner geometry, a scanning mirror size, a beam diameter, or a target, etc. The set of metrics may include the angular speed of the scanning mirror, the position of the scanning mirror, the optical scanner geometry, the scanning mirror size, the beam diameter, or a target, etc. For example, the filter coefficients 403 may be adapted or adjusted to better match the received signal. For example, the filter coefficients 403 may be initially determined from the theoretical simulation or modeling, then dynamically updated or adapted based on the angular speed of the scanning mirror, the position of the scanning mirror, the optical scanner geometry, or the target, etc. For example, when the angular speed of the scanning mirror is faster, the filter coefficients 403 may be updated to broaden a bandwidth of the matched filter.

In one embodiment, the matched filter coefficients 403 may be updated such that the matched filter bandwidth is proportional to the angular speed of the scanning mirror, the scanning mirror size, and/or the beam diameter.

In one embodiment, the set of coefficients may be updated based on a change in a hardware configuration or a system operation. For example, the set of coefficients may be updated based on an increase of a mirror angular speed or a change of a scan pattern.

In one embodiment, the filter coefficients 403 may be updated continuously, e.g., updated per 1 millisecond, 1 second, 15 seconds, 30 seconds, or any values therebetween. For another example, the filter coefficients 403 may be updated when detecting there is a change in the angular speed of the scanning mirror, the position of the scanning mirror, the optical scanner geometry, or the target, etc.

According to some embodiments, the matched filter 402 may be configured based on convolving waveforms. For example, in one scenario, the matched filter 402 may be configured to compare the received signal (e.g., the first frequency waveform) with the expected received signal (e.g., the second frequency waveform) to determine a similarity between them. As an example, the matched filter 402 may be configured to calculate a cross-correlation of the received signal PSD with the expected received signal PSD. For example, the maximum correlation value may represent the peak value of the received signal.

If the second frequency waveform which is the filtering known waveform is the complex conjugate of the received signal waveform which is the unknown waveform, then the signal-to-noise ratio (SNR) and probability of detection will be maximized by the matched filter 402. In one embodiment, the filtered received signal is inputted into a peak selection process to extract the range and velocity information. A peak value search 404 may be performed to detect a peak value from the received signal. Then, range and velocity information of the target may be extracted based on the peak value in the received signal. As the detection 405 occurs at the point where SNR is maximized, the method may result in more accurate frequency and energy measurements, thereby increasing the accuracy in range and velocity measurements of the target.

Figure 5:
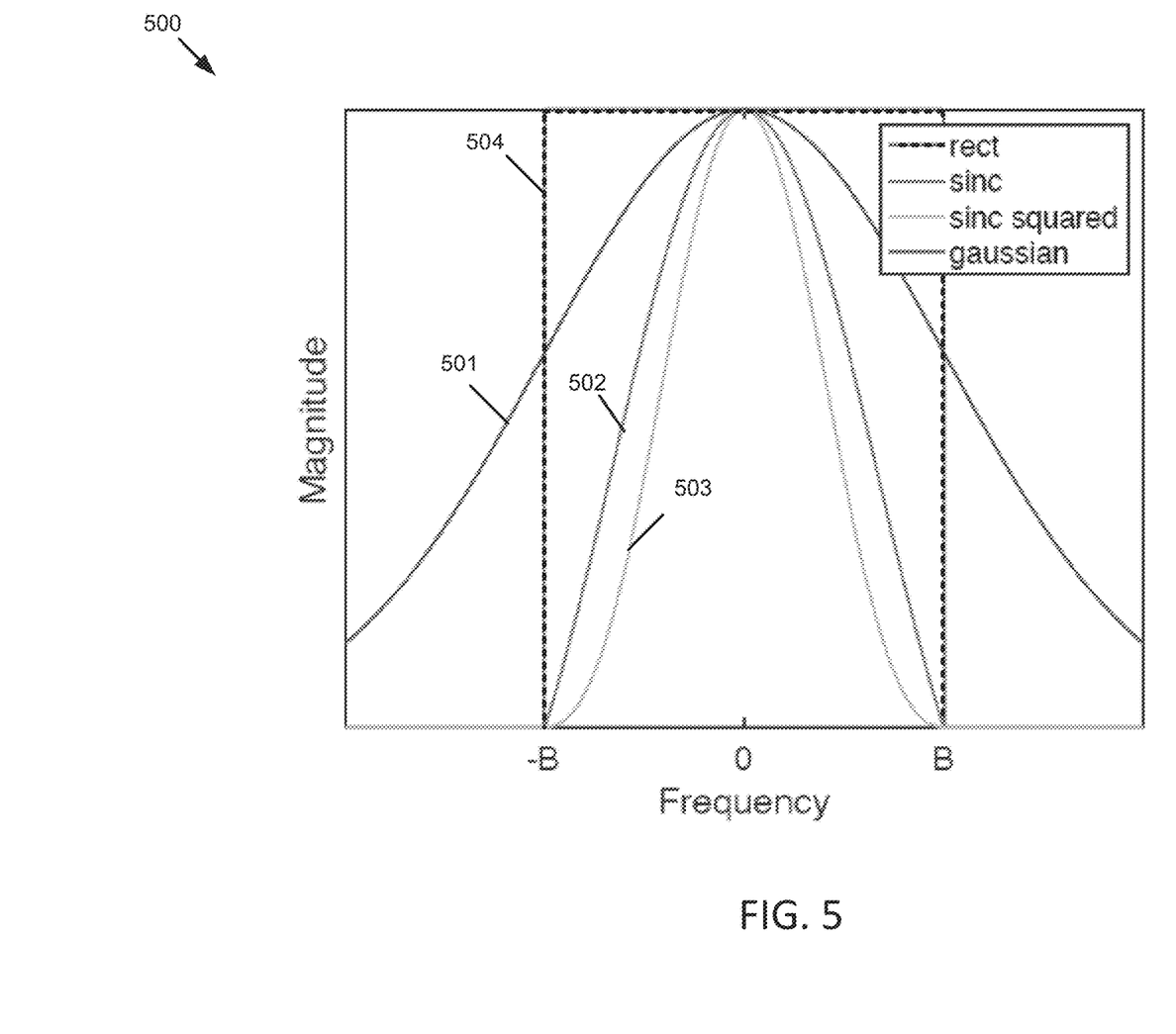
FIG. 5 is a diagram illustrating examples of matched filter waveforms according to embodiments of the present disclosure.

FIG. 5 is a diagram illustrating examples of matched filter waveforms according to embodiments of the present disclosure. Different matched filter waveforms (e.g., the second frequency waveform) may be selected based on theoretical simulation or modeling, or may be selected empirically. As an example, a matched filter may include a Gaussian waveform 501, where $M(f)=\exp(-0.5(f/B)^2)$, where B determines a filter bandwidth. As another example, a matched filter may include a sinc waveform 502, where $M(f)=\text{sinc}(f/B)$, if $|f| \leq B$; $M(f)=0$, otherwise, where B determines a filter bandwidth. As yet another example, a matched filter may include a sinc squared waveform 503, where $M(f)=\text{sinc}^2(f/B)$, if $|f| \leq B$; $M(f)=0$, otherwise, where B determines a filter bandwidth. As still another example, a matched filter may include a rectangular waveform 501, where $M(f)=1$, if $|f| \leq B$; $M(f)=0$, otherwise, where B determines a filter bandwidth. The above examples of the match filters may be defined by the parameter B, which determines the filter bandwidth. In one embodiment, the filter bandwidth may be directly proportional to the angular speed of the scanning mirror. The above examples of the match filters are only for illustration. There may be many other matched filter waveforms.

For implementation in digital signal processing, discrete-frequency filter coefficients may be obtained by sampling the continuous-frequency waveforms (e.g., 501-504).

Figure 6:
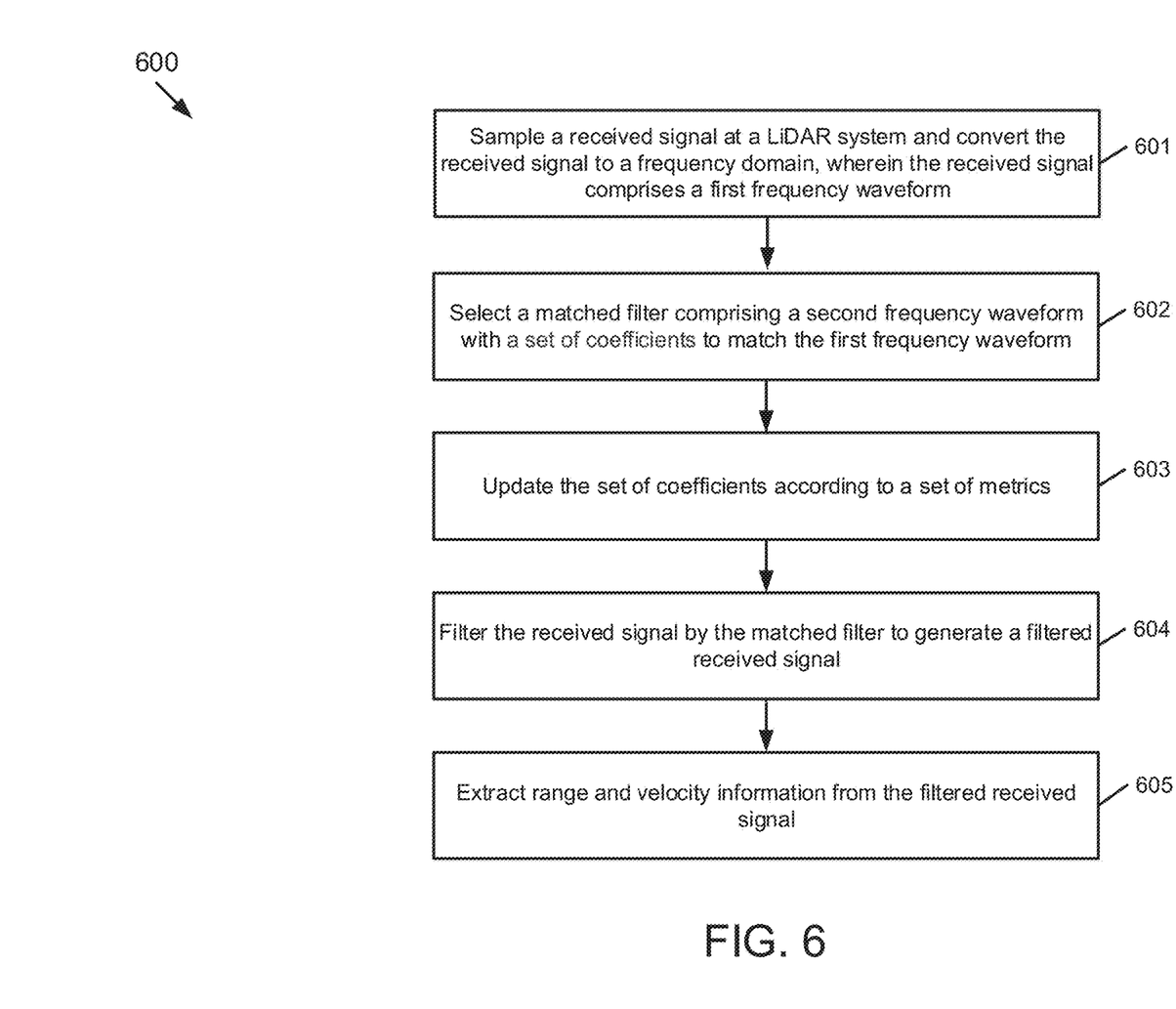
FIG. 6 is a flow diagram illustrating an example of a process of processing a received signal in a LiDAR system according to embodiments of the present disclosure.

FIG. 6 is a flow diagram illustrating an example of a process 600 of processing a received signal in a LiDAR system according to embodiments of the present disclosure. Process 600 may be performed by processing logic which may include software, hardware, or a combination thereof. The software may be stored on a non-transitory machine readable storage medium (e.g., on a memory device). For example, the process 600 may be performed by the matched filtering module 130 in the signal processing unit 112 of the LiDAR system 100, as illustrated in FIG. 1A-FIG. 1B. By this process, more accurate frequency and energy measurements may be achieved, thereby increasing the accuracy in range and velocity measurements of the target.

At block 601, the received signal is sampled at the LiDAR system and the received signal is converted to a frequency domain, where the received signal comprises a first frequency waveform.

At block 602, a matched filter is selected. The matched filter comprises a second frequency waveform with a set of coefficients to match the first frequency waveform. In one embodiment, the second frequency waveform is determined based on a model or a simulation or a measurement of an optical sub-system of the LiDAR system. In one embodiment, the second frequency waveform is determined based on an estimation of a PSD of the received signal.

In one embodiment, selecting a matched filter comprises selecting a rectangular waveform, a sinc waveform, a sinc squared waveform, or a Gaussian waveform to be the second frequency waveform. In one embodiment, the matched filter comprises at least one of a sinc waveform, a sinc squared waveform, a Gaussian waveform, or a rectangular waveform.

At block 603, the set of coefficients are updated according to a set of metrics. In one embodiment, the set of coefficients of the matched filter are updated according to at least one of an angular speed of a scanning mirror, a position of the scanning mirror, a geometry of an optical scanner, or the target.

In one embodiment, the set of coefficients are updated such that a filter bandwidth is proportional to an angular speed of a scanning mirror, a scanning mirror size, or a beam diameter. In one embodiment, the set of coefficients are updated based on a change in a hardware configuration or a system operation including a change of a mirror angular speed or a scan pattern change.

At block 604, the received signal may be filtered by the matched filter to generate a filtered received signal.

At block 605, range and velocity information is extracted from the filtered received signal. In one embodiment, the filtered received signal is inputted into a peak selection process to extract the range and velocity information. For example, a peak value of the filtered received signal is detected to extract range and velocity information of the target.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A method in a frequency-modulated continuous-wave (FMCW) light detection and ranging (LiDAR) system, comprising:
    generating an optical beam from an optical source and transmitting the optical beam to a target;
    receiving a return signal from the target based on the optical beam;
    sampling the return signal at the LiDAR system and converting the return signal to a frequency domain, wherein the return signal comprises a first frequency waveform;
    selecting a matched filter, the match filter comprising a second frequency waveform with a set of coefficients to match the first frequency waveform;
    updating the matched filter by updating the set of coefficients of the second frequency waveform according to a set of metrics, wherein the set of metrics include an angular speed of a scanning mirror;
    filtering the return signal by the matched filter to generate a filtered return signal; and
    extracting range and velocity information from the filtered return signal.

2. The method of claim 1, wherein selecting a matched filter comprises selecting a rectangular waveform, a sinc waveform, a sinc squared waveform, or a Gaussian waveform to be the second frequency waveform.

3. The method of claim 1, wherein the set of coefficients are further updated according to at least one of a position of the scanning mirror, a geometry of an optical scanner, or the target.

4. The method of claim 1, wherein the set of coefficients are updated such that a filter bandwidth of the matched filter is proportional to at least one of an angular speed of a scanning mirror, a scanning mirror size, or a beam diameter.

5. The method of claim 1, wherein the second frequency waveform is determined based on an estimation of a power spectrum density function of the return signal.

6. The method of claim 1, wherein the set of coefficients are updated based on a change in a hardware configuration or a system operation including a change of a mirror angular speed or a scan pattern change.

7. The method of claim 1, further comprising inputting the filtered return signal into a peak selection process to extract the range and velocity information.

8. The method of claim 1, wherein the second frequency waveform is determined based on a model or a simulation or a measurement of an optical sub-system of the LiDAR system.

9. A frequency-modulated continuous-wave (FMCW) light detection and ranging (LiDAR) system, comprising:
   an optical source to generate an optical beam for transmitting towards a target;
   a scanning mirror to scan the target;
   a photodetector to receive a return signal from the target based on the optical beam;
   a memory; and
   a processor, operatively coupled with the memory, to:
      sample the return signal at the LiDAR system and convert the return signal to a frequency domain, wherein the return signal comprises a first frequency waveform;
      select a matched filter, the match filter comprising a second frequency waveform with a set of coefficients to match the first frequency waveform;
      update the matched filter by updating the set of coefficients of the second frequency waveform according to a set of metrics, wherein the set of metrics include an angular speed of the scanning mirror;
      filter the return signal by the matched filter to generate a filtered return signal; and
      extract range and velocity information from the filtered return signal.

10. The LiDAR system of claim 9, wherein the second frequency waveform comprises a rectangular waveform, a sinc waveform, a sinc squared waveform, or a Gaussian waveform to be the second frequency waveform.

11. The LiDAR system of claim 9, wherein the set of coefficients are further updated according to at least one of a position of the scanning mirror, a geometry of an optical scanner, or the target.

12. The LiDAR system of claim 9, wherein the set of coefficients are updated such that a filter bandwidth of the matched filter is proportional to at least one of an angular speed of a scanning mirror, a scanning mirror size, or a beam diameter.

13. The LiDAR system of claim 9, wherein the second frequency waveform is determined based on an estimation of a power spectrum density function of the return signal.

14. The LiDAR system of claim 9, wherein the set of coefficients are updated based on a change in a hardware configuration or a system operation including a change of a mirror angular speed or a scan pattern change.

15. The LiDAR system of claim 9, wherein the processor operatively coupled with the memory is further to input the filtered return signal into a peak selection process to extract the range and velocity information.

16. The LiDAR system of claim 9, wherein the second frequency waveform is determined based on a model or a simulation or a measurement of an optical sub-system of the LiDAR system.

17. A non-transitory machine-readable medium having instructions stored therein, which when executed by a processor of a light detection and ranging (LiDAR) system, cause the processor to:
   generate an optical beam from an optical source and transmit the optical beam to a target;
   receive a return signal from the target based on the optical beam;
   sample the return signal at the LiDAR system and convert the return signal to a frequency domain, wherein the return signal comprises a first frequency waveform;
   select a matched filter, the match filter comprising a second frequency waveform with a set of coefficients to match the first frequency waveform;
   update the matched filter by updating the set of coefficients of the second frequency waveform according to a set of metrics, wherein the set of metrics include an angular speed of a scanning mirror;
   filter the return signal by the matched filter to generate a filtered return signal; and
   extract range and velocity information from the filtered return signal.

18. The non-transitory machine-readable medium of claim 17, wherein the second frequency waveform comprises a rectangular waveform, a sinc waveform, a sinc squared waveform, or a Gaussian waveform to be the second frequency waveform.

19. The non-transitory machine-readable medium of claim 17, wherein the set of coefficients are further updated according to a position of the scanning mirror, a geometry of an optical scanner, or the target.

20. The non-transitory machine-readable medium of claim 17, wherein the set of coefficients are updated such that a filter bandwidth of the matched filter is proportional to at least one of an angular speed of a scanning mirror, a scanning mirror size, or a beam diameter.

21. The non-transitory machine-readable medium of claim 17, wherein the second frequency waveform is determined based on an estimation of a power spectrum density function of the return signal.

22. The non-transitory machine-readable medium of claim 17, wherein the set of coefficients are updated based on a change in a hardware configuration or a system operation including a change of a mirror angular speed or a scan pattern change.

23. The non-transitory machine-readable medium of claim 17, wherein the processor operatively coupled with the memory is further to input the filtered return signal into a peak selection process to extract the range and velocity information.

24. The non-transitory machine-readable medium of claim 17, wherein the second frequency waveform is determined based on a model or a simulation or a measurement of an optical sub-system of the LiDAR system.

* * * * *